United States Patent [19]

Willis

[11] Patent Number: 5,945,236

[45] Date of Patent: Aug. 31, 1999

[54] LEAD-ACID BATTERY ELECTROLYTE FLUID SOLUTION ADDITIVE

[76] Inventor: John Willis, 73 Northridge Avenue Sunnyridge, Germiston, South Africa, 1401

[21] Appl. No.: 09/131,484

[22] Filed: Aug. 10, 1998

[51] Int. Cl.⁶ ..................................................... H01M 6/04
[52] U.S. Cl. ........................... 429/205; 429/203; 429/118
[58] Field of Search ..................................... 429/205, 118, 429/225, 227, 203

[56] References Cited

U.S. PATENT DOCUMENTS

| | | | |
|---|---|---|---|
| 1,429,830 | 9/1922 | Banks | 429/205 |
| 3,948,680 | 4/1976 | Mao et al. | 429/205 |
| 3,964,927 | 6/1976 | Villarreal-Dominguez | 429/205 |
| 5,738,956 | 4/1998 | Komoda | 429/205 |

*Primary Examiner*—Bruce F. Bell
*Attorney, Agent, or Firm*—Baker & Maxham

[57] ABSTRACT

A lead-acid battery electrolyte fluid solution additive is disclosed, the fluid solution additive including aluminum sulfate, cobalt sulfate, copper sulfate, magnesium sulfate, cadmium sulfate, sodium sulfate, potassium sulfate, and deionized water sufficient to effect extended battery life.

2 Claims, 1 Drawing Sheet

LEAD-ACID BATTERY ELECTROLYTE FLUID SOLUTION ADDITIVE

BACKGROUND OF THE INVENTION

This invention relates to lead-acid storage batteries, and more specifically, to a lead-acid battery electrolyte fluid solution additive.

Employed in vehicle and equipment starting and traction applications, lead-acid storage batteries are the oldest, most efficient, most reliable, most economical, and most widely used rechargeable electrochemical generator worldwide. Other applications for lead-acid batteries span the range from small portable devices to large sizes as used in submarines.

Over the past fifty years, little has changed to improve the performance and life of a lead-acid battery. Most improvements have been confined to such things as battery casings. For the most part, the reason a battery fails to continue to function effectively is due to the chemical process that takes place in each cell.

Essentially, a lead-acid battery is a series of cells, or grids of both high and low antimony. The negative plate is filled with grey oxide incorporating red lead oxide Barium Sulfate, and carbon black, while the positive plate is filled with grey oxide incorporating red lead oxide or litharge. Both plates are immersed into an electrolytic solution of diluted sulfuric acid. The red lead oxide plate is the positive pole and grey lead plate is the negative pole. In each cell, the anode is porous metallic lead and the cathode is made of lead dioxide. As a battery discharges, completing the circuit, electrons are released from the anode and the resulting $Pb^{2+}$ ions immediately react with $SO_4^{2-}$ ions precipitating out insoluble lead sulfate on the surface of the electrode. At the cathode, electrons from the external circuit reduce $PbO_2$ to water and $Pb^+$ ions, which also immediately react with sulfate ions to precipitate $PbSO_4$ on the electrode. The reactions are:

Anode: 
Cathode: 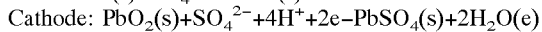
Left Side Total: 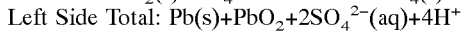

Both the cathode and the anode are largely converted to $PbSO_4(s)$ when the battery is fully discharged. By applying an opposite voltage to one cell, a reverse chemical reaction occurs and that cell will recharge. Lead-acid batteries undergo several charge/discharge/recharge cycles before they become inoperable and are recycled or enter the toxic waste stream. The reason for most batteries failing to operate properly is due to this electrochemical process, battery flaking of the $PbSO_4$, or from an internal short circuit.

As the battery discharges, the positive plate reacts with the sulfuric acid to produce lead ions and water. The negative plate simply dissolves to form lead ions in the process, which finally leads to the battery's complete failure. While charging, the positive plate builds up a thicker coating of lead oxide, migrating water, and lead ions from the sulfuric acid. As it does so, the negative plate bubbles and releases hydrogen from the sulfuric acid as it builds up a crust of lead.

It is the lead ions formed in the discharge cycle which cause problems. They agglomerate and fuse together with sulfate ions in sulfuric acid to form a highly insoluble lead sulfate. When this sulfate sediment builds a passive sediment layer on the electrodes, it reduces porous separator ionic conductivity by pore blocking and will eventually lead to cell shorting or self-discharge. The battery may well be serviceable in every other way, only the sulphation or calcification will stop the battery from operating.

Various battery additives claim to solve many of these problems mentioned above particularly, the rate of charging and starting power in hot and cold weather. U.S. Pat. Nos. 4,617,244, by Greene, 3,281,281, by Schaefer, and 3,945,849, by Hoffman, claim that a unique mixture of chelates and metal salts would increase the flow of current in the electrolyte to enhance battery performance characteristics. Although the mechanisms by which these mixtures work are undefined, the use of such a mixture could because of their known corrosive characteristics could cause accelerated decay of the lead plates leading to untimely battery failure.

SUMMARY OF THE INVENTION

It is an object of at least some embodiments of the present invention to increase power efficiency in a lead-acid battery.

It is another object of at least some embodiments of the present invention to lengthen battery life in a lead-acid battery.

Still another object of at least some embodiments of the present invention is to reduce the levels of hazardous gases and acid spray emissions in a lead-acid battery.

It is also an object of at least some embodiments of the present invention to reduce maintenance of a lead-acid battery.

It is an object of at least some embodiments of the present invention to reduce terminal corrosion in a lead-acid battery.

It is another object of at least some embodiments of the present invention to equalize acid specific gravity and voltage levels between individual cells in a lead-acid battery.

It is a related object of at least some embodiments of the present invention to alloy and strengthen lead plate components in a lead-acid battery.

It is an object of at least some embodiments of the present invention to clean the battery internally in a lead-acid battery.

In accordance with a preferred embodiment of the invention, a lead-acid battery electrolyte fluid solution additive comprises aluminum sulfate, cobalt sulfate, copper sulfate, magnesium sulfate, cadmium sulfate, sodium sulfate, potassium sulfate and deionized water sufficient to effect the battery life and wear.

In accordance with another preferred embodiment of the invention, a lead-acid battery electrolyte fluid solution additive is made with the following components as follows:

Ingredients
1. Copper Sulfate Cu $SO_4$ $7H_2O$
2. Aluminum Sulfate $Al_2$ $(SO_4)_3$ $15H_2O$
3. Cobalt Sulfate Co $SO_4$ $7H_2O$
4. Cadmium Sulfate Cd $SO_4$ $8H_2O$
5. Magnesium Sulfate $MgSO_4$ $7H_2O$
6. Sodium Sulfate $Na_2SO_4$
7. Potassium Sulfate $K_2SO_4$
8. Deionized Water Preferably, the above sulfate solution is mixed well to 4 parts deionized water and allowed to stand for approximately 20 minutes then bottled in light-proof glass or plastic bottle.

DETAILED DESCRIPTION OF THE PREFERRED EMBODIMENTS

Figure 1:
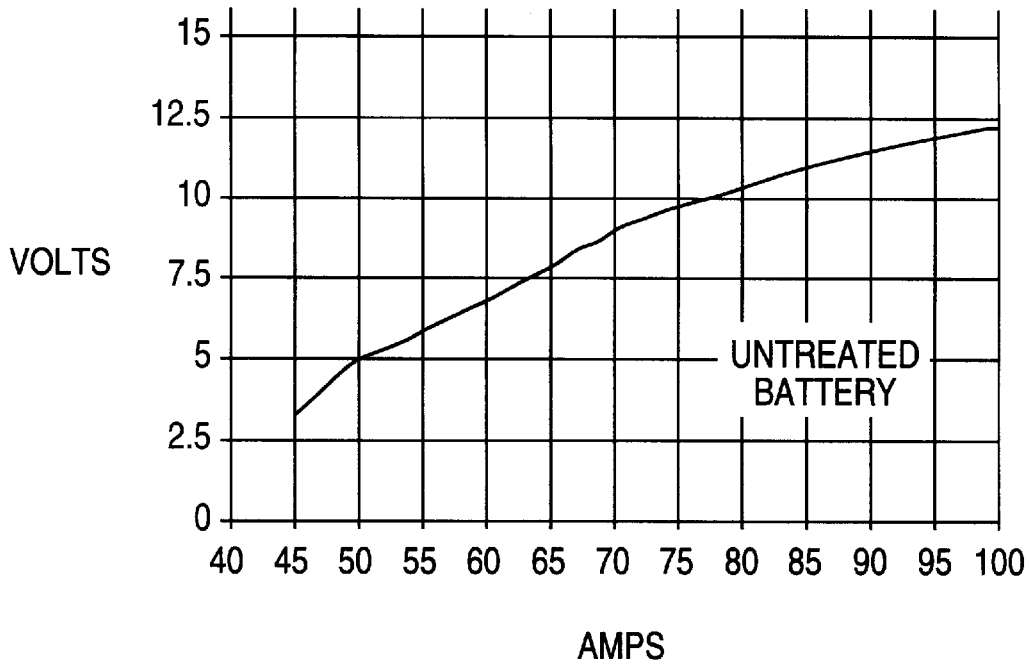
FIG. 1 is a graph showing drops in voltage and current for an untreated battery.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The sulfating calcification in a lead-acid battery can be effectively removed and partially dissolved by adding an additive according to the present invention to each cell. This new battery electrolyte additive is a complex alloy reagent which forms coordinating compounds with many metal ions, including the lead ions formed in the discharge cycle of a battery. The compound formed by the lead ions and the present invention in the lead sulfate of a battery plate is non-stable in the acid medium and breaks down the regenerated lead sulfate, which tends to sink and then settle at the bottom of the cell. Eventually, a portion of the non-electric conductive lead will dissolve back into the electrolyte. Any regenerated ions are free to continue their work. The special battery additive formula works long term, essentially slowly and continuously freeing the battery plates of sulfate calcification.

Tests conducted on additives according to the present invention by the North East Wales Institute, Deeside College in The United Kingdom showed a marked improvement in the power output, a reduction in the levels of hazardous gases and acid spray emissions, and equalization of acid specific gravities and voltages from cell to cell of the treated battery.

Additive fluid according to the present invention is added to the sulphuric acid electrolyte in lead-acid batteries to improve the performance and life of the batteries. The purpose of the additive is to improve batteries in the following areas:

1. To increase power efficiency.
2. To lengthen battery life.
3. To reduce the levels of hazardous gases and acid spray emissions.
4. To reduce maintenance.
5. To reduce terminal corrosion.
6. To equalize acid specific gravity and voltage levels between individual cells.
7. To alloy and strengthen lead plate components.
8. To clean batteries internally.

A program of tests were performed to examine the differences in behavior between two identical batteries, one treated by the additive and one untreated by the additive.

Two identical 12 volt lead-acid batteries were obtained and after treating one with the test fluid, both were subjected to the same charge-discharge cycles. Relatively high level charging and discharging, repeated under carefully monitored conditions was used to simulate long-term usage. Then, both batteries were cut open and dismantled to assess the deterioration of the internal components.

The tests were divided into three categories:

1. Electrical tests during charge-discharge.
2. Chemical tests on internal battery constituents.
3. Metallurgical investigations on electrode plates.

Two new batteries from the same manufacturer's batch were obtained. Their specification was as follows:

Voltage: 12 volts. Cells: 6.
Capacity: 34 Ampere-hours.
Type: To specifications DIN 135. SAE 235. IEC 150.
The sulphuric acid electrolyte in both batteries was specific gravity 1.250 @ 24° C., accurately measured into each cell, with allowance made for the 15 ml of additive added per cell in one of the batteries.

The batteries were electrically tested over the period 18th to 25th of April 1994. Each test cycle consisted of a charge of 10 Amps for 2 hours, followed by a high current discharge (ca. 100 Amps), with monitoring of voltage and current (see below for details.). The cycle was repeated 30 times. Battery discharge was carefully controlled using a Wilkson battery load tester type WIL 18/300, which allowed simultaneous monitoring of current and voltage when the load was applied.

At the end of the cycling neither of the batteries appeared to break down when the higher loads were impressed on them. After charge, both batteries were able to deliver three times their Ampere-hour rating (34 Ah) for a period of 15 seconds without dropping below 10 volts. The current/voltage characteristics for both batteries at the end of the cycling are shown in FIGS. 1 and 2.

Figure 2:
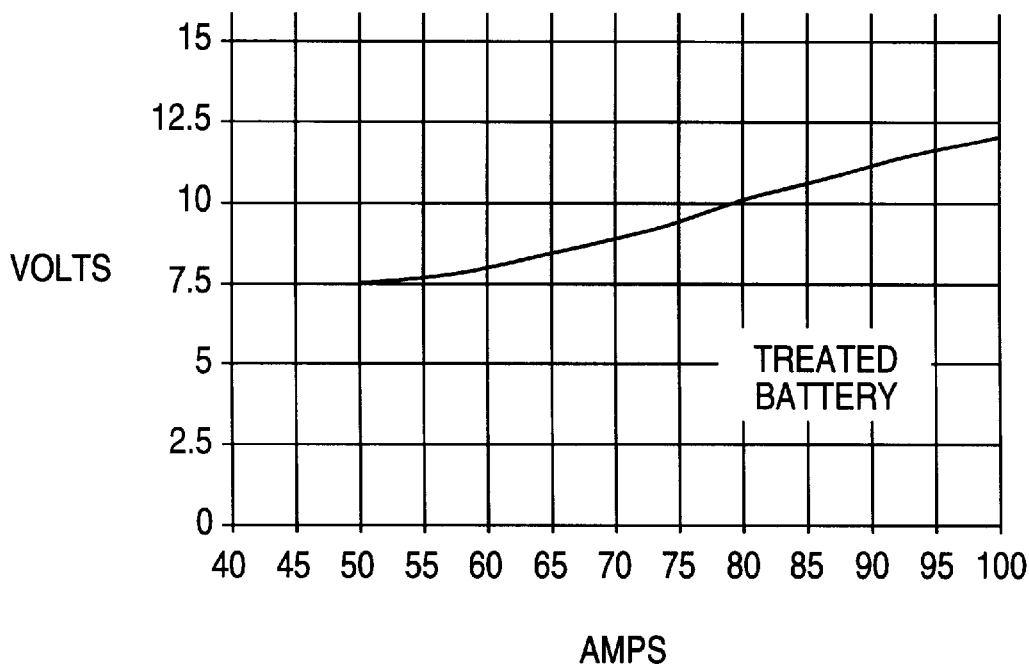
FIG. 2 is a graph showing drops in voltage and current for a treated battery.

FIGS. 1 and 2 show the marked improvement in power output for the treated battery. The untreated battery was initially delivering 100 A at 12V which dropped to only 45 A at 3.5V after the 3 minute discharge (158 Watts). In comparison, the treated battery polarized much less and delivered 50 A at 7.5V (375 Watts). This represents an improvement of 2.2 times in voltage and 14% more current.

Emission of gases represents wastage of energy, as current flow releases hydrogen and oxygen from unwanted side-reactions. Another undesirable effect of this is release of explosive gas mixtures and fine sulphuric acid mists. An important objection to gassing is the loss of water from the electrolyte, causing excessive top-up maintenance.

Loss of water was monitored over the 30 test cycles and was replaced using deionized water to maintain electrolyte levels. At the start of the tests, all electrolyte levels were equal. Some gassing and loss of water is inevitable, so the tests were to compare differences between treated and untreated batteries.

The makeup water qualities (in mls per cell) are given below.

Battery 1. (Treated).

| Cell 1. | Cell 2. | Cell 3. | Cell 4. | Cell 5. | Cell 6. |
| --- | --- | --- | --- | --- | --- |
| 70 ml | 70 | 70 | 60 | 70 | 70 |

Total water consumption: 410 ml.
Battery 2. (Untreated).

| Cell 1. | Cell 2. | Cell 3. | Cell 4. | Cell 5. | Cell 6. |
| --- | --- | --- | --- | --- | --- |
| 145 ml | 123 | 117 | 158 | 150 | 156 |

Total water consumption: 849 ml.

At the end of the test cycling on the last charge, it was noted visually that the untreated battery appeared to be releasing vast quantities of gas, compared to the moderate quantity from the treated battery. (Electrolyte levels were similar in both cases when this comparison was made.).

Excessive gassing with acid spray is a common cause of terminal corrosion on lead-acid batteries, so the pronounced reduction in gassing in the presence of the additive should contribute considerably to alleviating this problem.

Specific gravity was monitored with a hydrometer at various stages of charging and discharging and at various operating temperatures from 20° C. to a limit of 50° C. At no stage did the treated battery, No. 1, deviate more than 0005 units from the 1250 starting specific gravity. In comparison, the untreated battery, deviated by as much as 0020. (Note that acid was cooled to 24° C. before hydrometer readings were taken.)

This has important safety and maintenance implications, as unequal acid specific gravities from cell to cell can unbalance cell voltage and cause localized internal heating effects when high currents are passing. This may lead to thermal runaway and to battery explosion in extreme cases.

Now cleanliness of the electrolyte will be discussed. The good electrical performance of the treated battery should be related to a good, sulphate-free electrolyte, so this was checked when the tests where completed. Electrolytes from both batteries were compared and the visual appearance of the treated samples was superior. It was observed that the untreated electrolyte showed a dark, solid suspension. Viewing in different lights showed that the suspension had an orange-brown colour, suggesting that lead oxide had detached from the plates in the untreated battery. (Below the security of the grid fillings are discussed.)

Now mechanical tests on the lead plate grids will be discussed. Some of the plate grids were cleaned free of solid fillings and cut in half to give rectangular pieces about 12×5 cm. These were then tensile tested by centering between flat grips 2.5 cm wide. The geometry was not ideal for any valid results and this was confirmed when all tests gave a break in the jaws and also breaking loads were random and ultimately meaningless. It may be possible to test a large number of specimens and then average the scattered results to look for trends, but the situation is not ideal and this exercise is not likely to be worthwhile.

One observation which is worth mentioning is the fact that the plates from the treated cells tended to retain their electrical connection tag after battery dismantling, whereas the untreated plates' tags were generally broken. This is a sign that the acid vapour-exposed and stressed regions of the plates survived better with the additive.

Now the visual appearance of surfaces of the plates will be discussed. First, with respect to separators, comparing a treated separator surface and an untreated separator surface, the untreated separator surface was more stained, with white powdery deposit and generally more dark staining. Overall, the separators from the treated cells were cleaner and free from loose powdery matter.

With respect to the positive electrodes, there was observed a clear difference between the two plates, treated and untreated, with the untreated plate showing more whitish surface deposit, possibly lead sulphate, following the outline of the support grid. The grid filler was a little more loose in the untreated plates and this is obvious from the missing areas.

With respect to the negative electrodes, the state of the negative plates, showed little difference in appearance but with a much more loose filling in the untreated cells. (The solid suspension in the acid, discussed above, may have originated from plate disruption of this type.) It was noted when handling the loose negative electrodes that the untreated ones shed powder much more easily.

Now energy dispersive X-ray analysis (EDX) will be discussed. EDX in the scanning electron microscope was used to look for differences in any surface contamination between treated and untreated plates. All electrodes examined gave only a lead spectrum, and close examination of the fine detail in the background noise on the plot failed to find any other elements. The technique may not be sensitive enough to detect impurities at the levels present and a more elaborate analysis by (e.g., atomic absorption) is possibly needed. Unfortunately, EDX is not suitable for detecting sulphation of the plates, as the sulphur peak coincides with the main (highest) lead peak and cannot be separated.

After the 30 cycle test, some clear differences emerge between the untreated battery and the battery with the additive according to the present invention. Taking the subjects discussed above in turn, some general conclusions can be formulated from the tests.

With respect to power efficiency, there was a definite improvement in power efficiency by the use of the additive; compare 158 watts power (45 A at 3.5V) with the 375 watts (50 A at 7.5V) from the treated battery, a notable difference.

With respect to battery life, the 30 cycle test is too short compared to the overall life of a battery to make a clear judgment, but improvements in length of life can be inferred from the state of the electrolyte and the mechanical integrity of the plate fillings. Extrapolating the lower fragmentation behaviour of the plates seen in the presence of the additive to a longer life than the test period points to a useful improvement in overall life. Also, higher power output infers a longer service period before power output degenerates to an unacceptable level.

With respect to gas and spray emissions, there was a large reduction of water consumption in the presence of the additive (850 ml to 410 ml in the test is less than half) which is related to gas and spray evolution, so a very clear improvement is achieved.

With respect to maintenance reduction, this is related to the gas and spray emissions discussed above, where reduction in gassing and consumption of water to 50% of the non-additive level represents a valuable extension of the water topping-up intervals and a large reduction in maintenance.

With respect to terminal corrosion, the present tests did not give any information on this, but reduction of terminal corrosion in the presence of the additive can be inferred from the reduction in gassing and acid spray. (Corrosion of terminals and associated connectors is usually exacerbated by spray emissions.)

With respect to equalization of acid specific gravity and voltage levels, tighter control of acid gravity in the presence of the additive was demonstrated. Equalization of electrical performance between cells must be inferred from this, as before, so the chances of avoiding localized cell heating in a multi-cell battery leading to thermal runaway are improved.(Note also the equalization of gassing reported above.)

With respect to alloying and strengthening of lead plates, nothing definite can be said here, as mechanical tests were unsatisfactory and the EDX work failed to find any evidence of changes in plate and filler compositions. Perhaps a long-term test, more related to the real life of a battery instead of a relatively short 30 cycle exercise may give some more useful information.

(It is worth mentioning here that in the presence of the additive, some incidental evidence for increased tag strength was noted and improved integrity of the powdered plate fillers was also observed).

With respect to internal cleanliness, electrolyte cleanliness was improved by the additive as described above, where absence of suspended solids was clearly seen. Perhaps related to this is the additive giving better integrity to the solid plate fillers commented on above.

Now the graphs of FIGS. 1 and 2 will be discussed in more detail. FIG. 1 is a graph showing the drops in voltage and current occurring over a 3 minute period after applying a fixed load to give a current of 100 Amps at the start of the 3 minutes for an untreated battery. FIG. 2 is a graph showing the drops in voltage and current occurring over a 3 minute period after applying a fixed load to give a current of 100 Amps at the start of the 3 minutes for a treated battery. By comparing FIGS. 1 and 2, the performance of an untreated battery can be compared with performance of a treated battery.

To treat a battery, there is no need to empty and clean it out with water. Rather, between 15–100 mls. of this additive solution is added per battery cell. The battery is cycled approximately five times so that the additive is cycled and distributed throughout the working parts of the battery. Depending on the battery's condition at the time of the application, this special additive will enhance the charge/discharge characteristics, extend battery life, reduce gassing, equalize each cell, and restore toughness, thus increasing physical shock capability.

One feature of at least some embodiments of the present invention is that the additive interfaces with the battery's normal electrochemical reaction without causing any hindrance. In the same solution the individual compounds have a different Molar mass, g/mol; this is why several cycles are required to allow the compound to become fully absorbed. It is only a brief alternative in the normal cycle of:

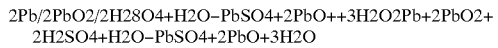

$$2Pb/2PbO2/2H2SO4+H2O-PbSO4+2PbO++3H2O2Pb+2PbO2+2H2SO4+H2O-PbSO4+2PbO+3H2O$$

As the alteration is not permanent in the solution, there is no need to record such. The essence of the compound is its ability to reduce migrating lead oxide particles into the porous separator.

The efficiency of a cell can be determined by means of an ampere-hour capacity ratio or watt-hour capacity ratio. Efficiency is a ratio between the output and the input of a cell and can be expressed as a percentage of per unit value. The introduction of the additive according to the present invention into the battery cell, because of the cohesion properties of the product, reduces both the particle shedding, which would normally choke the separators, and the electron passage. This can reduce this heat and improve the efficiency of a new battery by approximately 13–19%.

This now allows the battery to increase the output and input quality. The normal efficiency of a lead acid battery is approximately 67%, with the addition of an additive according to the present invention it can be increased to 72–76%. Inspecting the ratio of plate shedding over an extended period and the decline in power efficiency of an untreated battery against a battery treated with the additive, the user of the treated battery will realize an improvement in efficiency. This allows the operational efficiency of a lead-acid battery similar to that of an alkaline cell but with a higher voltage value.

Volume of additive is relative to the mass of the lead by 2% (i.e.: 10 kg lead=200 grams additive).

While the invention has been described in connection with preferred embodiments, it is not intended to limit the scope of the invention to the particular form set forth, but on the contrary, it is intended to cover such alternatives, modifications, and equivalents as may be included within the spirit and scope of the invention as defined by the appended claims.

I claim:

1. An electrolyte additive for lead-acid batteries, said additive comprising a mixture of aluminum sulfate, cobalt sulfate, copper sulfate, magnesium sulfate, cadmium sulfate, sodium sulfate, potassium sulfate, and deionized water.

2. A lead-acid battery electrolyte fluid solution additive comprising:

Aluminum Sulfate, Cobalt Sulfate, Copper Sulfate, Magnesium Sulfate, Cadmium Sulfate, Sodium Sulfate, Potassium Sulfate, and Deionized Water in a solution sufficient to affect battery life and wear.

* * * * *